(12) United States Patent
Yang et al.

(10) Patent No.: US 11,761,882 B2
(45) Date of Patent: Sep. 19, 2023

(54) CONNECTOR VISUAL INSPECTION APPARATUS

(71) Applicants: Tyco Electronics (Shanghai) Co. Ltd., Shanghai (CN); TE Connectivity Services GmbH, Schaffhausen (CH); TE Connectivity Morocco SARL, Port Tanger Med (MA)

(72) Inventors: An Yang, Shanghai (CN); Lvhai Hu, Shanghai (CN); Zouheir Atif, Montcada (ES); Roberto Francisco-Yi Lu, Bellevue, WA (US)

(73) Assignees: Tyco Electronics (Shanghai) Co., Ltd., Shanghai (CN); TE Connectivity Morocco SARL, Port Tanger Med (MA); TE Connectiyity Solutions GmbH, Schaffhausen (CH)

(*) Notice: Subject to any disclaimer, the term of this patent is extended or adjusted under 35 U.S.C. 154(b) by 25 days.

(21) Appl. No.: 17/410,418

(22) Filed: Aug. 24, 2021

(65) Prior Publication Data
US 2022/0069484 A1    Mar. 3, 2022

(51) Int. Cl.
*G01N 21/01* (2006.01)
*G01N 21/29* (2006.01)
*G01N 21/88* (2006.01)

(52) U.S. Cl.
CPC .............. *G01N 21/01* (2013.01); *G01N 21/29* (2013.01); *G01N 21/88* (2013.01)

(58) Field of Classification Search
CPC ..... G06T 7/00–001; G06T 7/70; H02G 15/02; H02G 1/14; G01B 11/26–27;
(Continued)

(56) References Cited

U.S. PATENT DOCUMENTS 4,738,508 A * 4/1988 Palmquist ............ G02B 6/3875
                                                  385/60
5,149,350 A * 9/1992 Itoh ...................... G02B 6/3805
                                                  356/73.1
(Continued)

FOREIGN PATENT DOCUMENTS

CN    102072907 A    5/2011
CN    108153011 A    6/2018
(Continued)

OTHER PUBLICATIONS

De Oliveira et al., Detection of defects in the manufacturing of electric motor stators using vision systems: Electrical connectors, 2016 12th IEEE International Conference on Industry Applications (INDUSCON), Curitiba, PR, Brazil, 2016, pp. 1-6 (Year: 2016).*

(Continued)

*Primary Examiner* — Daniel R Miller
(74) *Attorney, Agent, or Firm* — Barley Snyder (57) ABSTRACT

A connector visual inspection apparatus comprises a rotatable clamp for clamping a connector to be inspected. A first camera of the apparatus is arranged on one side of the clamp for capturing an end face image of the clamped connector along an axial direction of the connector. A computing device calculates an angular difference between an initial loading orientation and a predetermined orientation of the clamped connector according to the captured end face image. A drive device rotates the clamp around an axis that (Continued)

coincides with a central axis of the clamped connector by the calculated angular difference and into the predetermined orientation.

20 Claims, 5 Drawing Sheets

(58) Field of Classification Search
CPC ........ G01N 21/01; G01N 21/29; G01N 21/88; G01N 2021/0112; G01N 21/8851; G01N 2021/8887; H01R 43/00; H01R 13/465; H01R 2201/20; B23Q 3/00–04; G02B 6/385

See application file for complete search history.

(56) References Cited

U.S. PATENT DOCUMENTS

| | | |
|---|---|---|
| 6,259,960 B1 | 7/2001 | Inokuchi |
| 11,067,383 B2 | 7/2021 | Liu et al. |
| 11,403,743 B2 | 8/2022 | Liu et al. |
| 2008/0304051 A1* | 12/2008 | Wells ..................... G01M 11/31 356/73.1 |
| 2019/0113682 A1* | 4/2019 | Sakuma ................... G02B 6/02 |
| 2020/0412924 A1* | 12/2020 | Takahashi ............ H04N 5/2259 |

FOREIGN PATENT DOCUMENTS

| | | |
|---|---|---|
| CN | 109269445 A | 1/2019 |
| CN | 109313313 A | 2/2019 |
| CN | 109865679 A | 6/2019 |
| CN | 110340936 A | 10/2019 |
| CN | 209485301 U | 10/2019 |
| CN | 110940270 A | 3/2020 |
| CN | 111220620 A | 6/2020 |
| CN | 111257321 A | 6/2020 |
| JP | H06221819 A | 8/1994 |
| JP | 2013232342 A | 11/2013 |

OTHER PUBLICATIONS

G2 Technologies Takes Inspection to a New Level with Novel 3D Inspection System, May 4, 2017 (Year: 2017).*
First Office Action from the National Intellectual Property Office Administration of China dated May 29, 2023 with English translation, corresponding to Application No. 202010878185.1, 16 pages.

* cited by examiner

CONNECTOR VISUAL INSPECTION APPARATUS

CROSS-REFERENCE TO RELATED APPLICATIONS

This application claims priority under 35 U.S.C. § 119 to Chinese Patent Application No. 202010878185.1, filed Aug. 27, 2020, the entire disclosure of which is incorporated herein by reference.

FIELD OF THE INVENTION

The present disclosure relates to a visual inspection apparatus, and more particularly, to a visual inspection apparatus for a cable connector.

BACKGROUND

After a cable or other conductor is fitted with a connector, the connector must be inspected for quality after assembly. At the time of inspection, the cable connector must be held in a predetermined position or orientation with respect to both an axial direction thereof, as well as a radial direction. When manually loading a cable connector into a clamp or fixture for performing the quality inspection, however, there is often an orientation error in one or both of these directions. Such errors may affect the quality of the subsequent inspection.

Accordingly, there is a need for a system capable of ensuring the accurate positioning of a connector prior to inspection, as well as a system for automating at least portions of the inspection process after the connector is properly positioned or oriented.

SUMMARY

According to an embodiment of the present disclosure, a connector visual inspection apparatus comprises a rotatable clamp for clamping a connector to be inspected. A first camera of the apparatus is arranged on one side of the clamp for capturing an end face image of the clamped connector along an axial direction of the connector. A computing device calculates an angular difference between an initial loading orientation and a predetermined orientation of the clamped connector according to the captured end face image. A drive device rotates the clamp around an axis that coincides with a central axis of the clamped connector by the calculated angular difference and into the predetermined orientation.

BRIEF DESCRIPTION OF THE DRAWINGS

The invention will now be described by way of example with reference to the accompanying Figures, of which.

DETAILED DESCRIPTION OF THE EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a connector visual inspection apparatus includes a fixed bracket and a clamp rotationally mounted on the fixed bracket for clamping the connector to be inspected. A first camera is arranged at one side of the clamp for capturing an end face image of the clamped connector along an axial direction of the connector and/or a cable associated with the connector. A computing device of the apparatus is adapted to calculate an angular difference between an initial loading orientation and a predetermined orientation of the clamped connector according to the captured end face image. Once calculated, the clamp is rotated about an axis that coincides with a central axis of the clamped connector by a drive device to eliminate the calculated angular difference.

Figure 1:
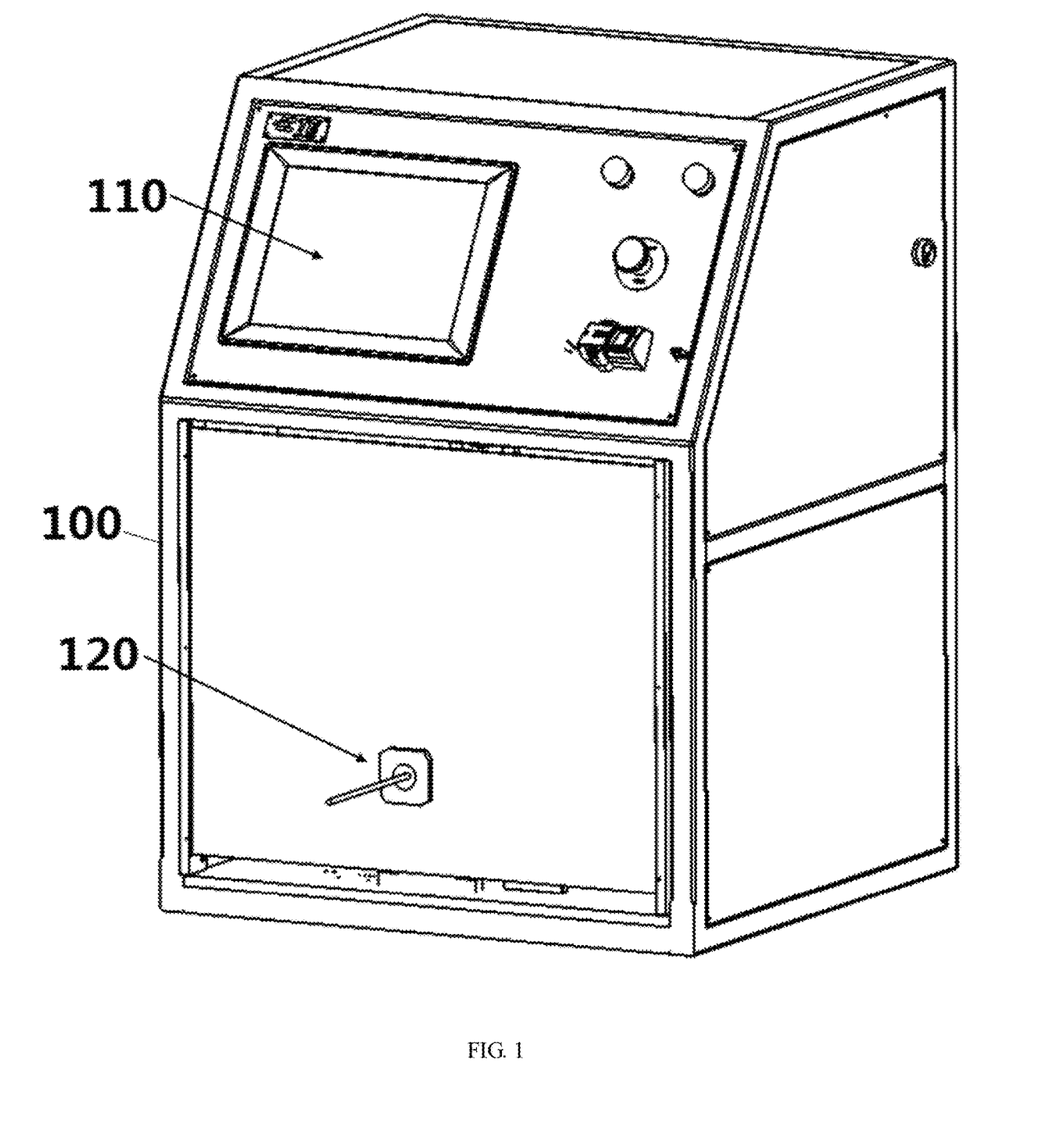
FIG. 1 is a perspective schematic view of a connector visual inspection apparatus according to an exemplary embodiment of the present disclosure, wherein various devices within the cabinet are not shown.
Figure 2:
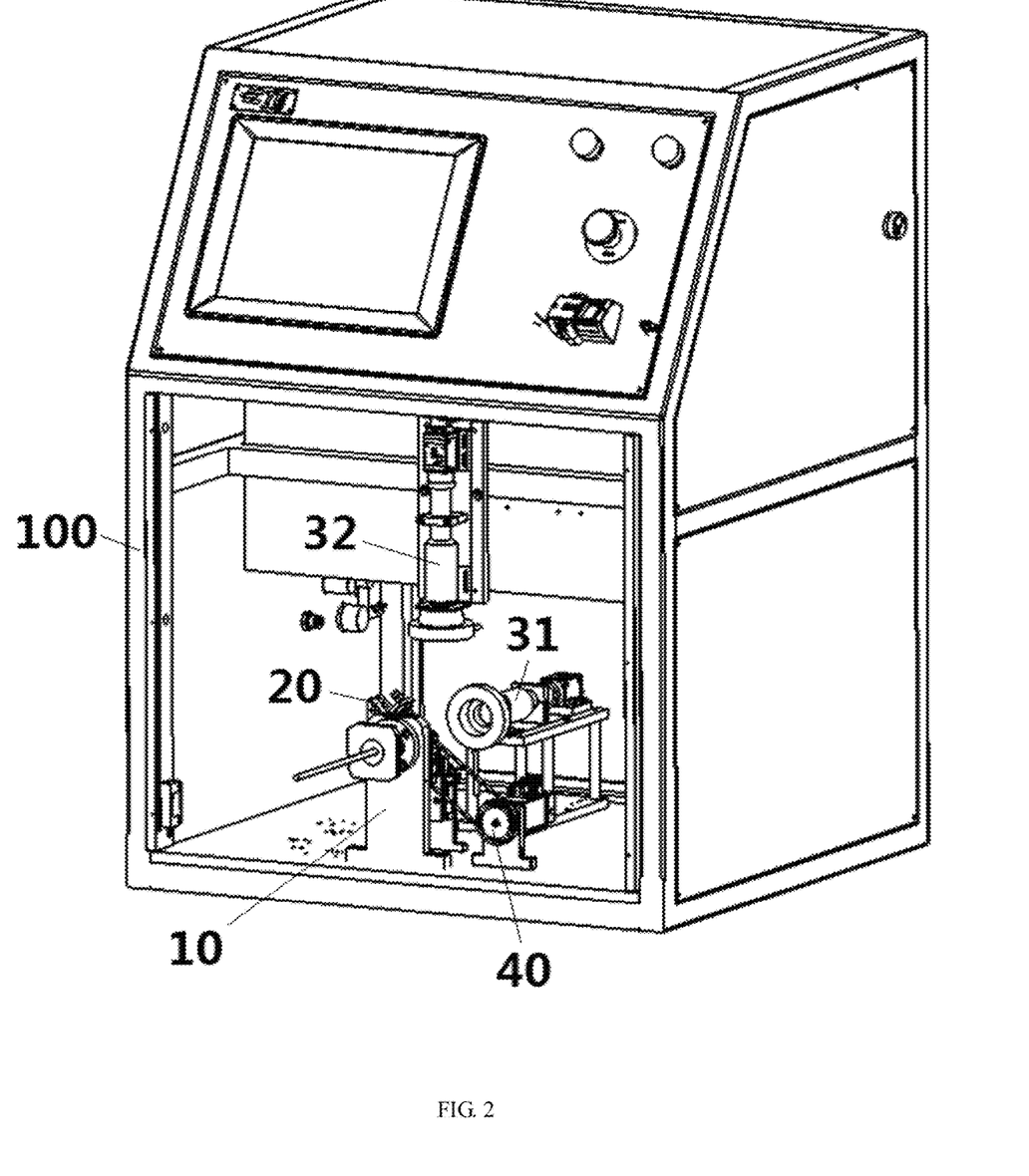
FIG. 2 is a perspective schematic view of the connector visual inspection apparatus according to an exemplary embodiment of the present disclosure, wherein various devices within the cabinet are shown.

FIG. 1 illustrates a perspective schematic view of the connector visual inspection apparatus according to an exemplary embodiment of the present disclosure, wherein various devices arranged within a cabinet are not shown. FIG. 2 illustrates a perspective schematic view of the connector visual inspection apparatus according to an exemplary embodiment of the present disclosure, wherein a door or access panel of the cabinet has been removed for revealing the devices arranged within the cabinet. As shown in FIGS. 1 and 2, the connector visual inspection apparatus includes a fixed bracket 10, a clamp 20, a first camera 31, a computing device or microprocessor (e.g., integrated into a control panel 110) and a drive device 40.

Figure 3:
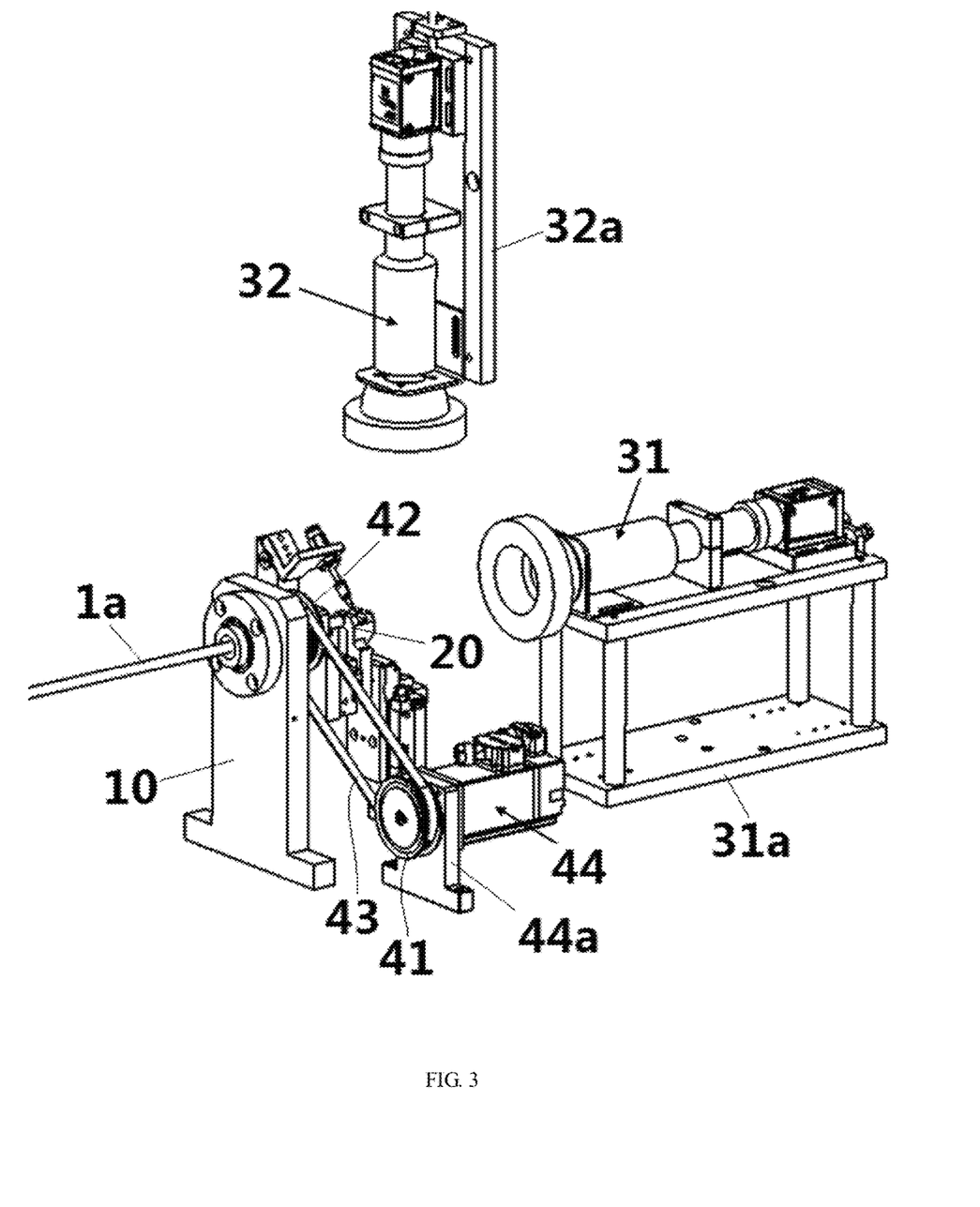
FIG. 3 is a perspective schematic view of the various devices within the cabinet shown in FIG. 2.
Figure 4:
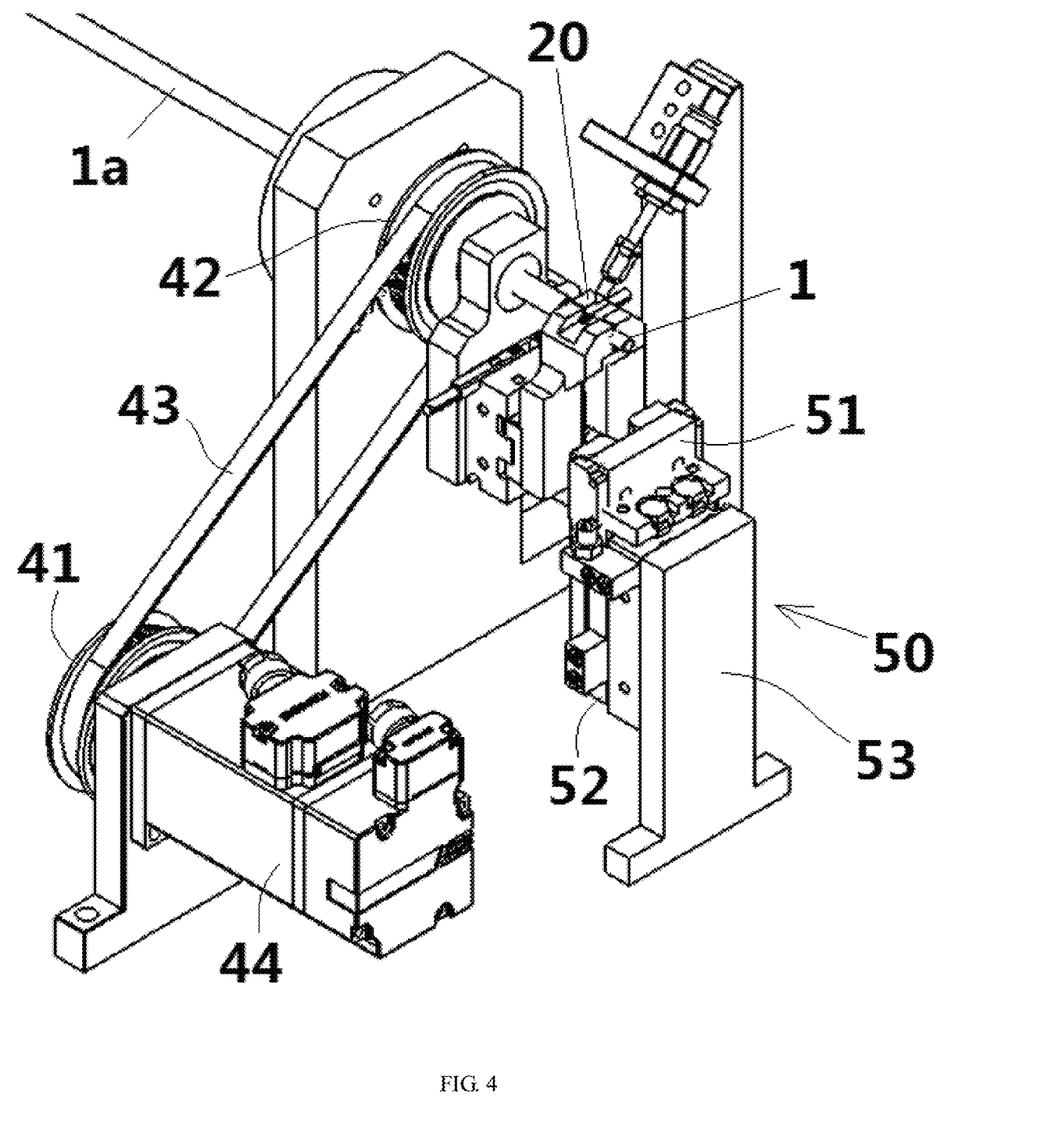
FIG. 4 is a perspective schematic view of the clamp, the drive device and the blocking device shown in FIG. 3.

FIG. 3 illustrates a perspective schematic view of the various devices within the cabinet shown in FIG. 2. FIG. 4 illustrates a perspective schematic view of the clamp 20, the drive device 40 and a blocking device 50 shown in FIG. 3. As shown in FIGS. 2-4, the clamp 20 is rotatably mounted on the fixed bracket 10 for clamping a connector 1 to be inspected. The first camera 31 is provided at one side of the clamp 20 for capturing an end face image of the clamped connector 1 along its axial direction. In the illustrated embodiment, the connector(s) 1 is a circular cable connector fitted to one or both free ends of a cable 1a.

Figure 5A:
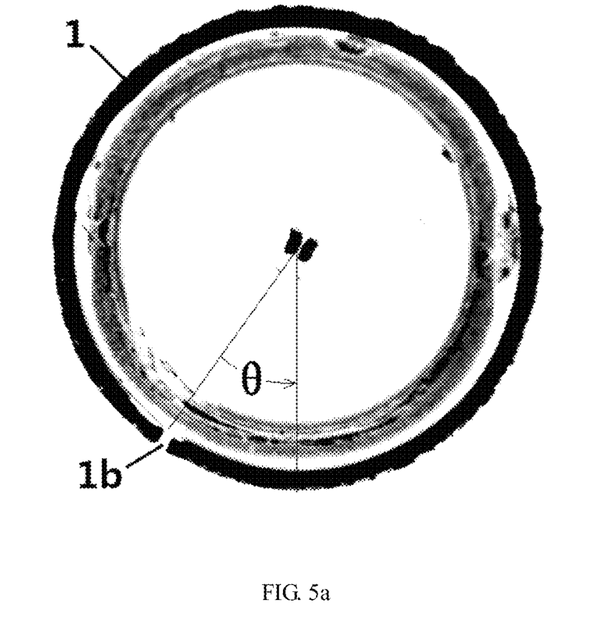
FIG. 5a is an end face image of the connector in an initial loading orientation.
Figure 5B:
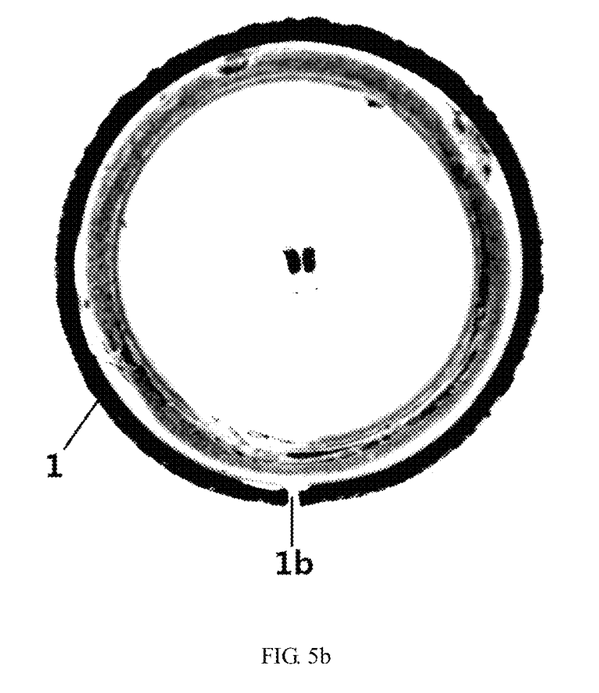
FIG. 5b is an end face image of the connector in a predetermined orientation.

FIG. 5a illustrates a captured end face image of the connector in an initial loading orientation. FIG. 5b illustrates a captured end face image of the connector in a predetermined orientation. As shown, the computing device is adapted to compute an angular difference θ between the initial loading orientation (e.g., the orientation shown in FIG. 5a) and the predetermined orientation (e.g., the orientation shown in FIG. 5b) of the clamped connector 1 according to the captured end face image.

As shown in FIGS. 1-5b, the drive device 40 is adapted to drive the clamp 20 to rotate about an axis coinciding with a central axis of the clamped connector 1 in order to eliminate the angular difference θ, i.e., to make the angular difference θ equal to zero. Thus, an orientation error of the clamped connector 1 can be eliminated such that the connector 1 is accurately held in a predetermined orientation, and the accuracy of a subsequent quality inspection can be improved.

The connector visual inspection apparatus further includes a second camera 32 configured to capture an image of a circumferential face the connector 1 held in a predetermined orientation along the radial direction. A quality judgment device or microprocessor (e.g., integrated into the control panel 110) is also provided and adapted to judge or determine whether the quality (e.g., roundness, linearity or other characteristic) of the connector 1 is or is not qualified or suitable based on the captured circumferential face image. In other embodiments, the quality judgment device is adapted to determine whether the connector 1 is of a predetermined sufficient quality based on the captured circumferential face image and the captured end face image.

In one embodiment, the computing device is adapted to compute an angular difference θ between the initial loading orientation and the predetermined orientation of the clamped connector 1 based on a positioning or locating feature 1b appearing on the captured end face image. The positioning feature 1b in or on the end face image includes, by way of example, a cut-out on formed on the end face of the clamped connector 1. However, the present disclosure is not limited to this, and the positioning feature 1b may also be recesses or projections formed on the end face of the clamped connector 1.

In the exemplary embodiment, an optical axis of the first camera 31 coincides with the central axis of the connector 1 clamped on the clamp 20. More specifically, the optical axis of the first camera 31 extends in the horizontal direction and faces the end face of the clamped connector 1. An optical axis of the second camera 32 may be arranged perpendicular to the central axis of the connector 1 clamped on the clamp 20. The optical axis of the second camera 32 extends in the vertical direction and is located directly above the connector 1.

The connector visual inspection apparatus further includes a blocking device 50 configured to restrict the end face of the clamped connector 1 to a predetermined position. Specifically, the blocking device 50 includes a blocking plate 51 provided between the clamped connector 1 and the first camera 31, and a lifting device 52 configured for driving the blocking plate 51 to move in the vertical direction. Before the connector 1 is loaded into the clamp 20, the lifting device 52 raises the blocking plate 51 to a blocking position contactable with the end face of the connector 1 to restrict or limit the movement of the end face of the connector 1 at a predetermined position along its axial direction. After the connector 1 is clamped to the clamp 20, the lifting device 52 lowers the blocking plate 51 to an avoidance position shown in FIGS. 3 and 4, in which the first camera 31 is not prevented from capturing the end face image. In one embodiment, the lifting device 52 is a pneumatic cylinder or a hydraulic cylinder having a piston rod that can be raised and lowered, and the blocking plate 51 is connected to the piston rod. However, the present disclosure is not limited thereto, and the lifting device 52 may be other types of linear actuators, such as an electric cylinder.

The clamp 20 is rotatably mounted to the fixed bracket 10 by bearings. The drive device 30 includes a motor 44, a first pulley 41 mounted on an output shaft of the motor 44, a second pulley 42 mounted on the clamp 20, and a driving belt 43 connected to the first pulley 41 and the second pulley 42. The motor 44 may be a servo motor such that the rotational angle of the clamp 20 can be precisely controlled to rotate the clamped connector 1 from the initial loaded orientation shown in FIG. 5a, to the predetermined orientation shown in FIG. 5b. In one embodiment, the clamp 20 comprises an electric clamp capable of automatically opening and closing.

The connector visual inspection apparatus further includes a cabinet 100. The fixed bracket 10, the clamp 20, the first camera 31, the second camera 32, the drive device 40 and the blocking device 50 are accommodated in the cabinet 100. The cabinet 100 includes an insertion opening 120 formed through the illustrated door or access panel. In this way, the connector 1 may be loaded into the clamp 20 located within the cabinet 100 via the insertion opening 120. The fixed bracket 10 for mounting the clamp 20, the motor mounting bracket 44a for mounting the motor 44, the first camera mounting bracket 31a for mounting the first camera 31, and the lifter mounting bracket 53 for mounting the lifting device 52 are fixed to a bottom wall or base of the cabinet 100. A second camera mounting bracket 32a for mounting the second camera 32 may be fixed to a bottom of one side wall of the cabinet 100.

The control panel 110 includes an interface for human-machine interaction disposed on the cabinet 100 and includes one or more microprocessors for performing each of the functions described herein. The clamp 20, the first camera 31, the second camera 32, the drive device 40 and the blocking device 50 may be controlled via the control panel 110 either automatically, or by a user via the interface (e.g., semi-automatically or manually).

The aforementioned computing device and the aforementioned quality judgment device may be an industrial personal computer having a microprocessor, which is accommodated in the cabinet. In other embodiments, as set forth above, the computing device and the quality judgment device are integrated into the control panel 110. Specifically, the computing device and the quality judgement device may be embodied as sets of instructions executed by a microprocessor of the control panel 110, or may be embodied as separate microprocessors forming part of the control panel for executing instructions for performing the operations and/or calculations described herein.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector visual inspection apparatus, comprising:
   a rotatable clamp for clamping a connector to be inspected, the connector fitted to an end of a cable;
   a first camera arranged at one side of the clamp for capturing an end face image of the clamped connector along an axial direction of the connector;
   a computing device calculating an angular difference between an initial loading orientation of the clamped connector captured by the end face image and a stored predetermined orientation; and
   a drive device rotating the clamp around an axis that coincides with a central axis of the clamped connector by the calculated angular difference and into the predetermined orientation.

2. The connector visual inspection apparatus according to claim 1, further comprising a second camera for capturing a circumferential face image of the connector held in the predetermined orientation along a radial direction.

3. The connector visual inspection apparatus according to claim 2, further comprising a quality judgment device determining whether the connector fitted to the end of the cable is of a predetermined sufficient quality according to the captured circumferential face image.

4. The connector visual inspection apparatus according to claim 3, wherein the quality judgment device determines whether the connector is of predetermined sufficient quality according to the captured circumferential face image and the captured end face image.

5. The connector visual inspection apparatus according to claim 2, wherein an optical axis of the first camera coincides with a central axis of the clamped connector, and an optical axis of the second camera is oriented perpendicular to the central axis of the clamped connector.

6. The connector visual inspection apparatus according to claim 5, wherein the optical axis of the first camera extends in a horizontal direction and faces the end face of the clamped connector, and the optical axis of the second camera extends in a vertical direction and is located directly above the clamped connector.

7. The connector visual inspection apparatus according to claim 2, further comprising a blocking device for restricting movement of the end face along the axial direction of the clamped connector.

8. The connector visual inspection apparatus according to claim 7, wherein the blocking device comprises:
   a blocking plate provided between the clamped connector and the first camera; and
   a lifting device for selectively driving the blocking plate to move in a vertical direction, wherein:
   before the connector is loaded on the clamp, the lifting device raises the blocking plate to a blocking position contactable with the end face of the connector to restrict the end face of the connector to a predetermined position, and
   after the connector is clamped to the clamp, the lifting device lowers the blocking plate to an avoidance position in which the first camera is not prevented from capturing an end face image.

9. The connector visual inspection apparatus according to claim 8, wherein the lifting device is a linear actuator having a moveable end connected to the blocking plate that can be raised and lowered.

10. The connector visual inspection apparatus according to claim 8, wherein the drive device includes a motor, a first pulley mounted on an output shaft of the motor, a second pulley mounted on the clamp, and a driving belt connected to the first pulley and the second pulley.

11. The connector visual inspection apparatus according to claim 7, further comprising a cabinet in which the clamp, the first camera, the second camera, the drive device and the blocking device are arranged.

12. The connector visual inspection apparatus according to claim 11, further comprising:
    a fixed bracket to which the clamp is rotatably mounted;
    a motor mounting bracket for mounting the drive device;
    a first camera mounting bracket for mounting the first camera;
    a lifting device mounting bracket for mounting the lifting device; and
    a second camera mounting bracket for mounting the second camera, wherein the fixed bracket, the motor mounting bracket, the first camera mounting bracket and the lifting device mounting bracket are fixed on a bottom wall of the cabinet, and the second camera mounting is fixed to a side wall of the cabinet.

13. The connector visual inspection apparatus according to claim 11, wherein an insertion opening is provided through the cabinet for receiving the connector for loading into the clamp.

14. The connector visual inspection apparatus according to claim 11, further comprising a control panel configured for human-machine interaction disposed on the cabinet, wherein the clamp, the first camera, the second camera, the drive device and the blocking device are controllable via the control panel.

15. The connector visual inspection apparatus according to claim 1, wherein the computing device calculates the angular difference between the initial loading orientation and the predetermined orientation of the clamped connector according to a positioning feature appearing in the captured end face image.

16. The connector visual inspection apparatus according to claim 15, wherein the positioning feature in the end face image includes a notch formed on an end face of the clamped connector.

17. The connector visual inspection apparatus according to claim 1, wherein the connector is a circular cable connector, and the cable is circular cable.

18. A connector visual inspection apparatus, comprising:
    a rotating electric clamp for automatically clamping a connector to be inspected, the connector attached to a cable;
    a first camera arranged on a side of the clamp for capturing an end face image of the clamped connector along an axial direction of the connector; and
    a drive device adapted to rotate the clamp around an axis that coincides with a central axis of the clamped connector, the drive device rotating the clamp by an angular difference calculated between an initial loading orientation of the clamped connector captured by the end face image and a stored predetermined orientation.

19. The connector visual inspection apparatus according to claim 18, further comprising a second camera for capturing a circumferential face image of the connector held in the predetermined orientation along a radial direction, wherein a quality of the connector is determined according to at least one of the captured circumferential face image, or the captured circumferential face image and the captured end face image.

20. The connector visual inspection apparatus according to claim 19, wherein an optical axis of the first camera coincides with a central axis of the clamped connector, and an optical axis of the second camera is oriented perpendicular to the central axis of the clamped connector.

* * * * *

UNITED STATES PATENT AND TRADEMARK OFFICE
CERTIFICATE OF CORRECTION

| | | |
|---|---|---|
| PATENT NO. | : 11,761,882 B2 | Page 1 of 1 |
| APPLICATION NO. | : 17/410418 | |
| DATED | : September 19, 2023 | |
| INVENTOR(S) | : An Yang | |

It is certified that error appears in the above-identified patent and that said Letters Patent is hereby corrected as shown below:

On the Title Page

Please insert Foreign Application Priority Data:
--Foreign Application Priority Data
August 27, 2020 (CN).....................................202010878185.1--

Signed and Sealed this
First Day of October, 2024

Katherine Kelly Vidal
*Director of the United States Patent and Trademark Office*